(12) United States Patent
Liu et al.

(10) Patent No.: US 8,463,039 B2
(45) Date of Patent: Jun. 11, 2013

(54) METHOD AND DEVICE FOR PARTITIONING BARRIER

(75) Inventors: Wei Liu, Liaoning (CN); Yingying Zhang, Liaoning (CN); Bobo Duan, Liaoning (CN); Huai Yuan, Liaoning (CN)

(73) Assignee: Neusoft Corporation, Shenyang, Liaoning (CN)

( * ) Notice: Subject to any disclaimer, the term of this patent is extended or adjusted under 35 U.S.C. 154(b) by 236 days.

(21) Appl. No.: 13/133,068

(22) PCT Filed: Apr. 30, 2009

(86) PCT No.: PCT/CN2009/071575
§ 371 (c)(1),
(2), (4) Date: Jun. 6, 2011

(87) PCT Pub. No.: WO2010/066123
PCT Pub. Date: Jun. 17, 2010

(65) Prior Publication Data
US 2011/0235913 A1 Sep. 29, 2011

(30) Foreign Application Priority Data
Dec. 10, 2008 (CN) .......................... 2008 1 0185794

(51) Int. Cl.
*G06K 9/34* (2006.01)
(52) U.S. Cl.
USPC .......................................................... 382/173
(58) Field of Classification Search
USPC ................. 382/173, 103–104, 106, 153, 154;
348/116–119, 142, 148, 169; 340/435–437;
701/1, 23, 24, 26, 28, 300–301, 520; 700/245
See application file for complete search history.

(56) References Cited

U.S. PATENT DOCUMENTS

| 6,753,902 | B1 * | 6/2004 | Kashiwazaki | ............... | 348/119 |
| 6,963,661 | B1 * | 11/2005 | Hattori et al. | ................ | 382/154 |
| 6,985,075 | B2 * | 1/2006 | Takeda | .......................... | 340/435 |
| 7,706,572 | B2 * | 4/2010 | Hattori et al. | ................ | 382/103 |

(Continued)

FOREIGN PATENT DOCUMENTS

| CN | 1617170 A | 5/2005 |
| CN | 101038164 A | 9/2007 |

(Continued)

OTHER PUBLICATIONS

Japanese Notification of Reason for Refusal regarding Application No. 2011-539876, dated Nov. 15, 2012. Translation provided by Unitalen Attorneys at Law.

(Continued)

*Primary Examiner* — Ishrat I Sherali
(74) *Attorney, Agent, or Firm* — Harness, Dickey & Pierce, P.L.C.

(57) ABSTRACT

A barrier partitioning method and device are used for partitioning a barrier area from an image. The method includes: performing edge detecting and partitioning blocks to the image to obtain multiple edge image blocks; performing beeline detection to each edge image block to obtain beelines respectively; for each beeline, determining the line direction of the beeline corresponding to a standard road plane, and determining the edge image block to be a barrier block according to the line direction; forming all the determined barrier blocks to be a barrier area according to a connection principle.

13 Claims, 5 Drawing Sheets

U.S. PATENT DOCUMENTS

| | | | |
|---|---|---|---|
| 8,238,657 B2* | 8/2012 | Takeda et al. | 382/173 |
| 8,239,084 B2* | 8/2012 | Yamamoto et al. | 701/26 |
| 2005/0131581 A1* | 6/2005 | Sabe et al. | 700/245 |
| 2007/0211917 A1* | 9/2007 | Nakano et al. | 382/103 |

FOREIGN PATENT DOCUMENTS

| | | |
|---|---|---|
| CN | 101067557 A | 11/2007 |
| JP | 6215290 A | 8/1994 |
| JP | 2004246436 A | 9/2004 |
| JP | 2005182158 A | 7/2005 |

OTHER PUBLICATIONS

Changhui Yang, et al., "A New Approach for In-Vehicle Camera Obstacle Detection by Ground Movement Compensation," Proceedings of the 11th International IEEE Conference on Intelligent Transportation Systems, Beijing, China, Oct. 12-15, 2008.

International Search Report for PCT/CN2009/071575, mailed Sep. 3, 2009.

* cited by examiner

METHOD AND DEVICE FOR PARTITIONING BARRIER

CROSS-REFERENCE TO RELATED APPLICATIONS

This application is a 371 U.S. National Stage of International Application No. PCT/CN2009/071575, filed Apr. 30, 2009. This application claims priority to Chinese Patent Application No. 200810185794.8, entitled "Obstacle Segmentation Method and Apparatus," filed Dec. 10, 2008 with State Intellectual Property office of PRC. The disclosures of the above applications are incorporated herein by reference in their entirety.

FIELD OF THE INVENTION

The present invention relates to the field of image processing technique, and in particular to an obstacle segmentation method and apparatus in visual obstacle detection field.

BACKGROUND OF THE INVENTION

In visual obstacle detection field, an obstacle generally refers to a solid object above ground plane which has vertical features.

So far, there are two main solutions for monocular vision-based obstacle segmentation: one is feature-based segmentation algorithm, and the other is movement-based segmentation algorithm. The feature-based obstacle segmentation method, since typically utilizing features of the obstacle to proceed a segmentation, in which case it is required to know the features of the obstacle to be segmented in advance, is only adapted to segment particular types of obstacles, for example, segment a vehicle according to the features such as the shadow under the vehicle or lamps of the vehicle, segment a pedestrian by symmetry and color characters, etc. Movement-based obstacle segmentation method is adapted to segment an obstacle only when a multi-frame image is needed as an input. Therefore, the application of the movement-based segmentation algorithm is limited.

SUMMARY OF THE INVENTION

In view of this, the present invention provides an obstacle segmentation method and apparatus which can solve the problem in the prior art that the existing solutions are only adapted to segment particular types of obstacles.

To achieve the above objects, an embodiment of the present invention provides the following technical solutions:

An obstacle segmentation method for separating an obstacle region from an image includes: performing edge detection and partition on the image to obtain a plurality of edge image blocks; performing a line detection on each of the edge image blocks to obtain lines respectively; determining a line segment direction of a line segment, on a reference road plane, corresponding to each of the lines, and determining that the edge image block involving at least one of the lines is an obstacle block according to the direction of the line segment; and generating an obstacle region from all the determined obstacle blocks according to a connectivity principle.

The method further includes: determining that a certain edge image block is not an obstacle block if no line is detected by the line detection.

The process of determining the direction of the line segment, on the reference road plane, corresponding to each of the lines includes: determining two pixel points G1 and G2 of the line in the image; calculating world coordinates of G1 and G2 on the reference road plane from a camera imaging formula according to coordinates of G1 and G2 in the image; and determining the direction of the line segment, on the reference road plane, corresponding to the line according to the world coordinates of G1 and G2.

The process for determining that the edge image block involving each of the lines is an obstacle block according to the direction of the line segment includes: determining a distance of an intersection point of the X-axis on the reference road plane and an extension line of a line segment connecting two points on the reference road plane that correspond to two end points of the line, according to the direction of the line segment; comparing the distance with a predetermined threshold; and determining that the edge image block is an obstacle block if the distance is less than or equal to the threshold, or determining that the edge image block is not an obstacle block.

The connectivity principle is an 8-connectivity principle.

An obstacle segmentation apparatus for separating an obstacle region from an image includes: an edge detection unit adapted to perform edge detection and partition on the image to obtain a plurality of edge image blocks; a line detection unit adapted to perform a line detection on each of the edge image blocks to obtain lines; a line segment direction determination unit adapted to determine a direction of a line segment, on a reference road plane, corresponding to each of the lines; an obstacle block determination unit adapted to determine that the edge image block involving at least one of the lines is an obstacle block according to the direction of the line segment; and an obstacle region determination unit adapted to determine an obstacle region from all the determined obstacle blocks according to a connectivity principle.

The line segment direction determination unit includes: a pixel point determination subunit adapted to determine two pixel points G1 and G2 of the line in the image; a world coordinate calculation subunit adapted to calculate world coordinates of G1 and G2 on the reference road plane from a camera imaging formula according to the coordinates of G1 and G2 in the image; and a line segment direction determination subunit adapted to determine the direction of the line segment, on the reference road plane, corresponding to the line, according to the world coordinates corresponding to G1 and G2.

The obstacle block determination unit includes: an intersection distance determination subunit adapted to determine a distance of an intersection point of an X-axis on the reference road plane and an extension line of a line segment connecting two points on the reference road plane that correspond to two end points of the line, according to the direction of the line segment; a comparison subunit adapted to compare the distance with a predetermined threshold; and an obstacle block determination subunit adapted to determine that the edge image block is an obstacle block if the distance is less than or equal to the threshold, or determine that the edge image block is not an obstacle block.

The obstacle segmentation method and apparatus according to the present invention can be applied to a single frame image without being limited to types of the obstacles so as to realize the segmentation for any type of obstacles, thereby having a wider suitability. Moreover, because the present invention determines an obstacle block by using the feature that an obstacle in the real world is perpendicular to the road plane and an extension line of the line segment on the road plane that corresponds to the edge of the obstacle in the image passes through a projection point that the camera projected onto the road plane or an adjacent area near the projection point, less false segmentations are produced.

BRIEF DESCRIPTION OF THE DRAWINGS

In order to explain the technical solutions in embodiments of the present invention more clearly, drawings accompanying the embodiments are briefly illustrated hereinafter. Apparently, the accompanying drawings described hereinafter are only for some embodiments of the present invention, and those skilled in the art can further conceive other drawings according to the drawings without creative work.

DETAILED DESCRIPTION OF THE INVENTION

Hereinafter, the technical solutions in embodiments of the present invention are described clearly and completely in conjunction with the accompanying drawings of the embodiments of the present invention. It is obvious that the described embodiments are only a part of embodiments of the present invention, but not all embodiments. Other embodiments obtained by those skilled in the art on the basis of the embodiments of the present invention without creative work will fall into the protection scope of the present invention.

Figure 1:
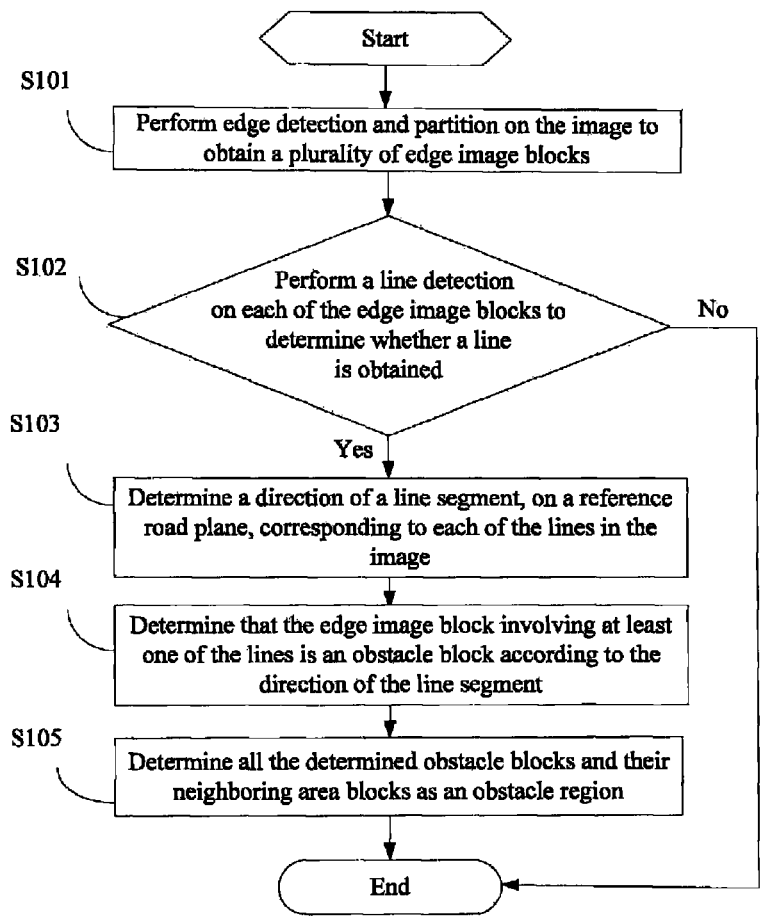
FIG. 1 is a flow chart of an obstacle segmentation method according to the present invention.

The present invention provides an obstacle segmentation method for separating an obstacle region from an image. Referring to FIG. 1, the method includes the following steps:

S101: Performing edge detection and partition on the image to obtain a plurality of edge image blocks;

S102: Performing a line detection on each of the plurality of edge image blocks to determine whether a line is obtained, and performing step S103 on edge image blocks for which lines are obtained, or determining edge image blocks for which no line is obtained as non-obstacle blocks and ending the method;

S103: Determining a direction of a line segment, on a reference road plane, corresponding to each of the lines;

S104: Determining whether the edge image block involving at least one of the lines is an obstacle block according to the direction of the line segment; and S105: Determining all the determined obstacle blocks as an obstacle region in a connectivity principle after the edge image block involving at least one of the lines is determined as an obstacle block.

The reference road plane corresponding to a certain image is dependent on the image and is typically a ground plane.

The connectivity principle refers to that a certain obstacle block and adjacent obstacle blocks connected therewith are determined as an obstacle region.

It can be seen that according to the present invention the obstacle blocks are determined according to the directions of the line segments corresponding to the lines with respect to the reference road plane, i.e., the obstacle region is determined through the directions of the line segments corresponding to the obstacle on the road plane of the real world by means of the vertical edge feature of the obstacle, so as to achieve segmentation of any type of an obstacle, which leads to a wide suitability.

The obstacle segmentation method according to the present invention is illustrated in detail hereinafter in conjunction with the drawings and a particular embodiment.

The embodiment includes the following steps: step 1, step 2, step 3, step 4 and step 5.

Step 1: Edge Detection.

An input image is divided into K sub-images with a size of M×N, and a Sobel vertical edge detection is performed on each of the sub-images to obtain an edge sub-image, and the obtained edge sub-images are assembled into an edge image of the input image according to the position of the sub-images in the input image.

Where, N and M are natural numbers, and N may be equal to or not equal to M.

Step 2: Line Detection.

The edge image obtained in step 1 is divided into a plurality of n×m sub-edge image blocks (where n and m are natural numbers, n indicating the number of rows, and m indicating the number of columns). A line detection is performed on each of the sub-edge image blocks, and the end points and the number of edge points of all detected lines, LineNum, is recorded. The common line detection methods include Hough transformation and chain code.

Preferably, the Hough transformation is adopted. In short, the idea of the Hough transformation is: a point in an original image coordinate system corresponds to a line in a parameter coordinate system, and likewise, a line in the parameter coordinate system corresponds to a point in the original coordinate system. All points of a line in the original coordinate system have the same slope and intercept as each other, and thus all the points correspond to one point in the parameter coordinate system. In this way, after the respective points in the original coordinate system are projected into the parameter coordinate system, an accumulation point, if existing in the parameter coordinate system, corresponds to a line in the original coordinate system.

The line detection methods such as Hough transformation and chain code are prior arts, and thus are not discussed in detail herein.

Step 3: Determining the Direction of the Line Segment, that Corresponds to the Line, on the Road Plane.

Figure 2:
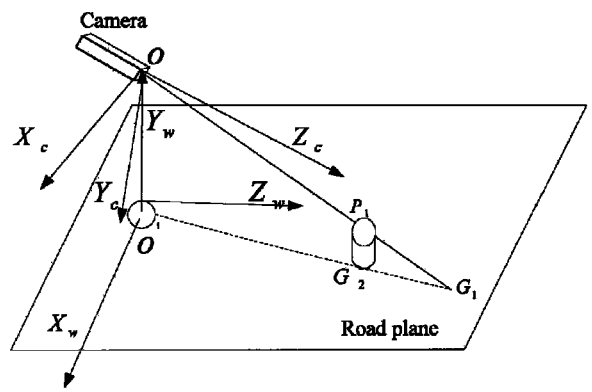
FIG. 2 is a first schematic diagram of a world coordinate system and a camera coordinate system according to an embodiment of the present invention.

A world coordinate system and a camera coordinate system as shown in FIG. 2 is set up.

It is assumed that the image coordinates of two end points of the ith line among all the lines detected in a certain block of the image in step 2 are $I_1(r_{i1}, c_{i1})$, $I_2(r_{i2}, c_{i2})$ respectively. It is assumed that the two image points are imaged from two end points $P_1$ and $G_2$ of a solid object in the real world, and $G_1$ is an intersection point of the road plane and a line connecting the point $P_1$ and the optical center O. The world coordinates of points $G_1$ and $G_2$ on the road plane can be calculated by the following method.

The calculating process is as follows:

A certain pixel point P(r,c) in the image is taken for an example, where r, c are respectively a row coordinate and a column coordinate of the point in the image (already given), and P is an imaging point of a point $P_0(X_w, Y_w, Z_w)$ on the road plane. According to a camera imaging formula (also called as a video camera imaging formula):

$$Z_C \begin{bmatrix} r \\ c \\ 1 \end{bmatrix} = \begin{bmatrix} \alpha_x & 0 & u_0 & 0 \\ 0 & \alpha_y & v_0 & 0 \\ 0 & 0 & 1 & 0 \end{bmatrix} \begin{bmatrix} R & t \\ 0^T & 1 \end{bmatrix} \begin{bmatrix} X_w \\ Y_w \\ Z_w \\ 1 \end{bmatrix} \quad \text{Formula 1}$$

where, $Y_w$, is given as a height of the camera, $\alpha_x$, $\alpha_y$, $u_0$, $v_0$ are intrinsic parameters of the camera, which can be obtained from the calibration of the camera, $Z_c$ is the Z-axis coordinate of $P_0$ in the camera coordinate system;

$$R = \begin{pmatrix} \cos\gamma\cos\beta & \cos\gamma\sin\beta\sin\alpha - \sin\gamma\cos\alpha & \cos\gamma\sin\beta\cos\alpha + \sin\gamma\sin\alpha \\ \sin\gamma\cos\beta & \cos\alpha\cos\gamma + \sin\gamma\sin\beta\sin\alpha & \sin\gamma\sin\beta\cos\alpha - \cos\gamma\sin\alpha \\ -\sin\beta & \cos\beta\sin\alpha & \cos\beta\cos\alpha \end{pmatrix}$$

is a
rotation matrix, and $\alpha, \beta, \gamma$ are respectively rotation angles by which the camera coordinate system rotates around X, Y, Z axis of the world coordinate system; and A translation vector $$t = \begin{bmatrix} T_x \\ T_y \\ T_z \end{bmatrix},$$

where $T_x, T_y, T_z$ indicate the position of the origin of the camera coordinate system in the world coordinate system, and in the present embodiment, $T_x=0$, $T_y$=the height of the camera, and $T_z=0$.

It can be seen from formula 1 that, there are three equations and three unknowns ($Z_c, X_w, Z_w$) in formula 1 if the image coordinate (r,c) and the height of the camera, i.e., $Y_w$ are given. Therefore, the world coordinate of the point $P_0$, on the road plane, corresponding to the image point P can be calculated.

In addition, it can be seen from the imaging principle that, if the obstacle is completely perpendicular to the road plane (i.e., $P_1 G_2$ is perpendicular to the road plane), the extension line of the line segment connecting the intersection point $G_1$ and the intersection point $G_2$ passes through the origin o' of the world coordinate system, where $G_1$ is an intersection point of the road plane and a line connecting $P_1$ and the optical center O, and $G_2$ is an intersection point of the obstacle and the road plane. Considering the fact that an actual obstacle is possibly not completely perpendicular to the road plane, an intersection point $o_1$ of X axis and the extension line does not necessarily pass through o', but the distance between the intersection point $o_1$ and o' would be in a limited range, i.e., the extension line extends towards o', as shown in FIG. 3.

Figure 3:
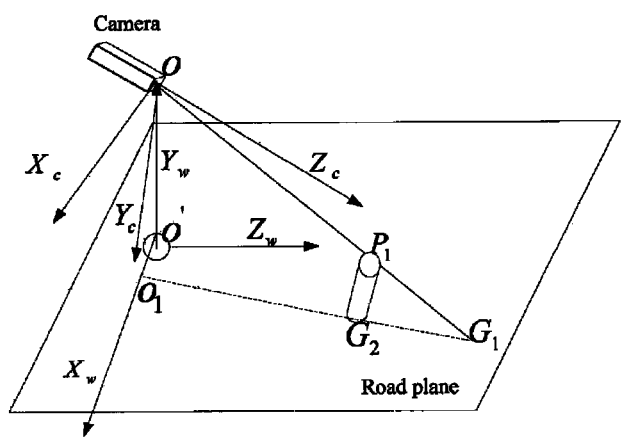
FIG. 3 is a second schematic diagram of a world coordinate system and a camera coordinate system according to an embodiment of the present invention.

To this end, the direction of the extension line $G_1 G_2$ on the road plane, that corresponds to the line as shown in FIG. 3 is determined in the following way:

According to formula 1, the world coordinates of $G_1$ and $G_2$ are obtained as $(X_{i1}, Y_{i1}, Z_{i1})$ and $(X_{i2}, Y_{i2}, Z_{i2})$ respectively, the intersection point of X axis in the world coordinate system and the line defined by the two points $G_1$ and $G_2$ is $o_1$ $(X_{i0},0,0)$, and then $$X_{i0} = \left| -Z_{i1} \frac{X_{i2} - X_{i1}}{Z_{i2} - Z_{i1}} + X_{i1} \right|$$

is derived.

Step 4: Determination of the obstacle Blocks.

An sub-edge image block is an obstacle block if the sub-edge image block satisfies the following conditions:

There are lines in the block, and among the lines there is at least one line that satisfies the following conditions: the distance between points $o_1$ and o' is less than a predetermined threshold, in which $o_1$ is an intersection point of the X axis and an extension line of a line segment connecting two points, on the road plane of the real world, that correspond to two end points of the at least one line.

Step 5: Generation of an Obstacle Region.

Figure 4:
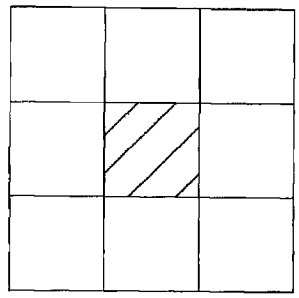
FIG. 4 is a schematic diagram of generating an obstacle region according to an embodiment of the present invention.

A candidate obstacle region is generated using the sub-edge image blocks obtained in step 4 according to the connectivity principle, preferably, the 8 connectivity principle, that is, if a certain block is deemed as a candidate obstacle and one block or several blocks in the candidate obstacle's 8 neighborhoods are also deemed as candidate obstacles, the certain block together with the one block or several blocks in the candidate obstacle's 8 neighborhoods constitute an obstacle region. The 8 neighborhoods are 8 blocks adjacent to the block. As shown in FIG. 4, 8 blank blocks are 8 neighborhoods of the filled block.

Corresponding to the method described above, the present invention also provides an obstacle segmentation apparatus. The apparatus can be realized by means of software, hardware, or a combination of software and hardware.

Figure 5:
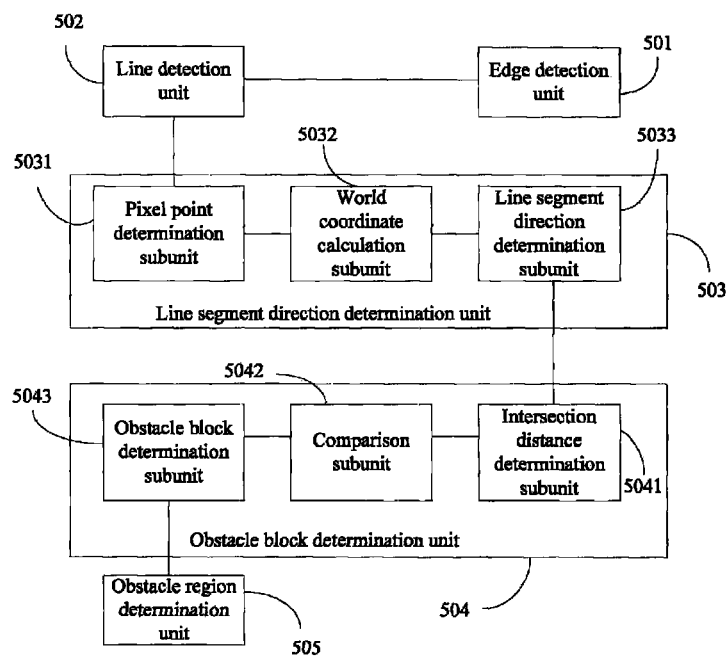
FIG. 5 is a schematic diagram of an internal structure of an obstacle segmentation apparatus according to the present invention.

FIG. 5 is a schematic view of an internal structure of the apparatus. The apparatus includes an edge detection unit 501, a line detection unit 502, a line segment direction determination unit 503, an obstacle block determination unit 504, and an obstacle region determination unit 505.

The edge detection unit 501 is adapted to perform edge detection and partition on an image to obtain a plurality of edge image blocks.

The line detection unit 502 is adapted to perform a line detection on each of the edge image blocks obtained by the edge detection unit 501 to obtain lines respectively.

The line segment direction determination unit 503 is adapted to determine a direction of a line segment, on a reference road plane, corresponding to each of the lines obtained by the line detection unit 502.

The obstacle block determination unit 504 is adapted to determine whether each of the edge image blocks is an obstacle block according to the direction of the line segment determined by the line segment direction determination unit 503.

The obstacle region determination unit 505 is adapted to determine all obstacle blocks determined by the obstacle block determination unit 504 as an obstacle region to according to a connectivity principle.

Wherein:

The line segment direction determination unit 503 further includes: a pixel point determination subunit 5031, a world coordinate calculation subunit 5032, and a line segment direction determination subunit 5033.

The pixel point determination subunit 5031 is adapted to determine two pixel points G1 and G2 of the line in the image.

The world coordinate calculation subunit 5032 is adapted to calculate world coordinates of G1 and G2 on the reference road plane according to the coordinates of G1 and G2 in the image from the camera imaging formula.

In particular, the camera imaging formula is:

$$Z_C \begin{bmatrix} r \\ c \\ 1 \end{bmatrix} = \begin{bmatrix} \alpha_x & 0 & u_0 & 0 \\ 0 & \alpha_y & v_0 & 0 \\ 0 & 0 & 1 & 0 \end{bmatrix} \begin{bmatrix} R & t \\ 0^T & 1 \end{bmatrix} \begin{bmatrix} X_w \\ Y_w \\ Z_w \\ 1 \end{bmatrix} \quad \text{Formula 1}$$

Where, taking the calculation of the world coordinate of G1 for an example:

$Y_w$ is given as a height of the camera, $\Delta_x$, $\Delta_y$, $u_0$, $v_0$ are intrinsic parameters of the camera, which can be obtained by a calibration of the camera;

$Z_c$ is the Z-axis coordinate of G1 in the camera coordinate system;

$$R = \begin{pmatrix} \cos\gamma\cos\beta & \cos\gamma\sin\beta\sin\alpha - \sin\gamma\cos\alpha & \cos\gamma\sin\beta\cos\alpha + \sin\gamma\sin\alpha \\ \sin\gamma\cos\beta & \cos\alpha\cos\gamma + \sin\gamma\sin\beta\sin\alpha & \sin\gamma\sin\beta\cos\alpha - \cos\gamma\sin\alpha \\ -\sin\beta & \cos\beta\sin\alpha & \cos\beta\cos\alpha \end{pmatrix}$$

is a rotation matrix, and $\alpha,\beta,\gamma$ are respectively rotation angles by which the camera coordinate system is rotated around X, Y, Z axis in the world coordinate system;

A translation vector $$t = \begin{bmatrix} T_x \\ T_y \\ T_z \end{bmatrix},$$

where $T_x, T_y, T_z$ indicate the position of the origin of the camera coordinate system in the world coordinate system, and in the present embodiment, $T_x=0$, $T_y$=height of the camera, and $T_z=0$.

It can be seen from formula 1 that, if the image coordinate (r,c) is given and the height of the camera, i.e., $Y_w$ is given, there are three equations and three unknowns ($Z_c, X_w, Z_w$) in formula 1. In this case, the world coordinate of a point, on the road plane, corresponding to the image point G1 can be calculated. In the same way, the world coordinate of a point, on the road plane point, corresponding to the image point G2 can be calculated.

The line segment direction determination subunit 5033 is adapted to determine the direction of the line segment, on the reference road plane, corresponding to the line according to the world coordinates of G1 and G2.

In particular,

The world coordinates of $G_1$ and $G_2$, are obtained as ($X_{i1}, Y_{i1}, Z_{i1}$) and ($X_{i2}, Y_{i2}, Z_{i2}$) respectively from formula 1, an intersection point of the X axis in the world coordinate system and the line defined by the two points $G_1$ and $G_2$ is $o_1(X_{i0},0,0)$, and then $$X_{i0} = \left| -Z_{i1} \frac{X_{i2} - X_{i1}}{Z_{i2} - Z_{i1}} + X_{i1} \right|$$

is derived.

The obstacle block determination unit 504 further includes: an intersection distance determination subunit 5041, a comparison subunit 5042, and an obstacle block determination subunit 5043.

The intersection distance determination subunit 5041 is adapted to determine an intersection distance of the X-axis on the reference road plane and an extension line of two points on the reference road plane corresponding to two end points $G_1$ and $G_2$ of the line according to the direction of the line segment.

The comparison subunit 5042 is adapted to compare the intersection distance with a predetermined threshold.

The obstacle block determination subunit 5043 is adapted to determine that the edge image block is an obstacle block if the intersection distance is less than or equal to the threshold, or determine that the edge image block is not an obstacle block if the intersection distance is more than the threshold.

In addition,

The edge detection unit 501 may perform the edge detection on the image by adopting a Sobel method.

The line detection unit 502 may perform the line detection on the edge image blocks by adopting the Hough transformation or chain code method.

The obstacle region determination unit 505 may determine the obstacle block and its neighboring area blocks as an obstacle region according to the connectivity principle.

The obstacle segmentation method and the apparatus thereof as described in the present invention are adapted to a single frame image without defining the type of the obstacle, and are able to perform segmentation on any type of obstacles, with less false segmentations, thereby having a wider suitability.

Figure 6A:
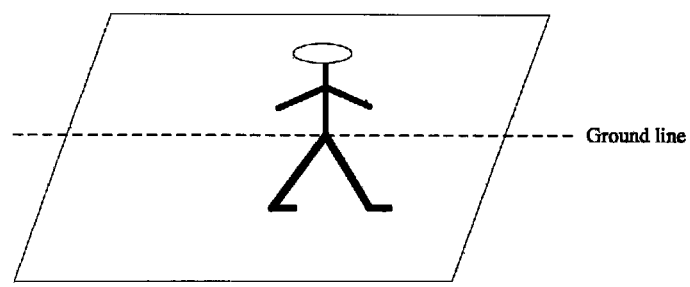
FIG. 6a to FIG. 6d are schematic diagrams of application examples of the present invention.
Figure 6B:
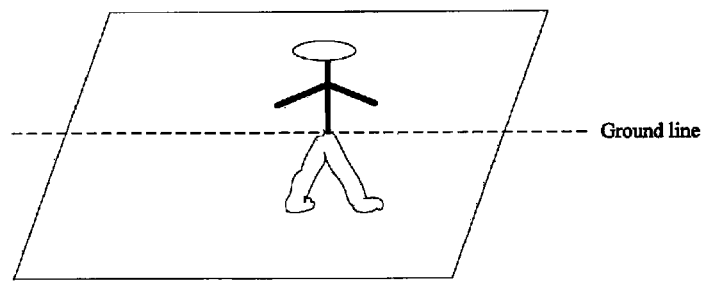
Figure 6C:
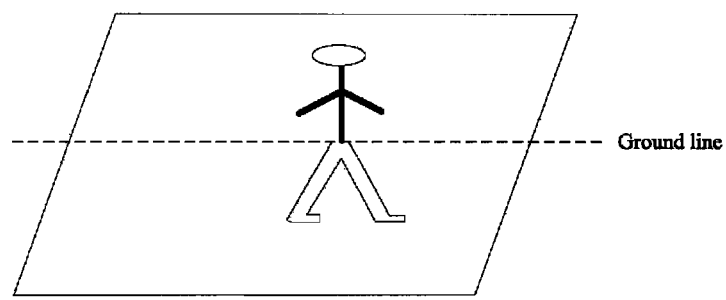
Figure 6D:
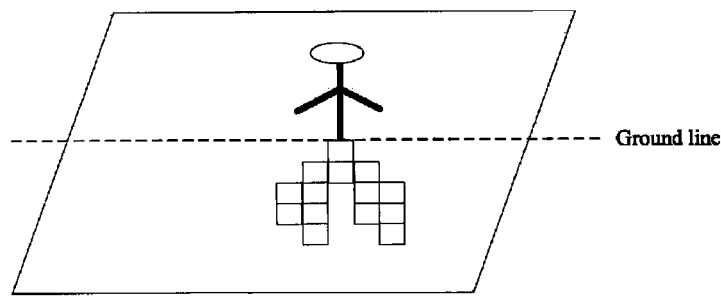

In short, the application of the present invention is to segment a given original image to determine that which areas in the image might contain obstacles. The accompanying drawings indicating the experimental results show the specific application scene. That is, firstly an original image (FIG. 6a) is given, then by the steps of edge detection (FIG. 6b) and line detection (FIG. 6c), and the calculation of direction of a line segment corresponding to each of the lines on a road plane and the determination of obstacles, an obstacle region as shown in FIG. 6d is generated. In the present embodiment, only a part of the image below the vanishing line is processed, where the "vanishing line" is also referred to as "horizon line".

It can be understood for those skilled in the art that the processes for realizing the method provided by the embodiments described above can be accomplished by means of hardware related to program commands, where the program can be stored in a readable storage medium, and executes the corresponding steps described in the above method when the program is executed. The storage medium may be, for example, ROM/RAM, magnetic disk, optical disk, etc.

The forgoing descriptions are only the preferred embodiments of the present invention, and it should be noted that numerous improvements and modifications to the present invention can also be made by those skilled in the art without being departing from the principle of the present invention, and those improvements and modifications shall fall into the protection scope of the invention.

The invention claimed is:

1. An obstacle segmentation method for separating an obstacle region from an image, comprising:
   performing edge detection and partition on the image to obtain a plurality of edge image blocks;
   performing a line detection on each of the edge image blocks to obtain lines respectively;
   determining a line segment direction of a line segment, on a reference road plane, corresponding to each of the lines, and determining that an edge image block involving at least one of the lines is an obstacle block according to the direction of the line segment; and
   generating an obstacle region from all the determined obstacle blocks according to a connectivity principle.

2. The method according to claim 1, further comprising:
   determining that a certain edge image block is not an obstacle block if no line is detected by the line detection.

3. The method according to claim 1, wherein the process of determining the line segment direction of the line segment, on the reference road plane, corresponding to each of the lines comprises:
   determining image coordinates of two end points of the line in the image;

calculating world coordinates of the end points on the reference road plane, which correspond to the image coordinates of the end points, from a camera imaging formula according to the image coordinates of the end points in the image; and determining the direction of the line segment, on the reference road plane, corresponding to the line according to the world coordinates.

4. The method according to claim 1, wherein the process for determining that the edge image block involving at least one of the lines is an obstacle block according to the direction of the line segment comprises:

determining a distance between an origin of a world coordinate system and an intersection point of an X-axis on the reference road plane and an extension line of a line segment connecting two points on the reference road plane that correspond to two end points of the at least one line, according to the direction of the line segment;

comparing the distance with a predetermined threshold; and determining that the edge image block is an obstacle block if the distance is less than or equal to the threshold, or determining that the edge image block is not an obstacle block.

5. The method according to claim 1, wherein the connectivity principle is an 8-connectivity principle.

6. An obstacle segmentation apparatus for separating an obstacle region from an image, comprising:

an edge detection unit, adapted to perform edge detection and partition on the image to obtain a plurality of edge image blocks;

a line detection unit, adapted to perform a line detection on each of the edge image blocks to obtain lines;

a line segment direction determination unit, adapted to determine a direction of a line segment, on a reference road plane, corresponding to each of the lines;

an obstacle block determination unit, adapted to determine that the edge image block involving at least one of the lines is an obstacle block according to the direction of the line segment corresponding to the lines; and an obstacle region determination unit, adapted to determine an obstacle region from all the determined obstacle blocks according to a connectivity principle.

7. The apparatus according to claim 6, wherein the line segment direction determination unit comprises:

a pixel point determination subunit, adapted to determine image coordinates of two end points of the line in the image;

a world coordinate calculation subunit, adapted to calculate world coordinates of the end points on the reference road plane, which correspond to the image coordinates of the end points, from a camera imaging formula according to the image coordinates of the end points in the image; and a line segment direction determination subunit, adapted to determine the direction of the line segment, on the reference road plane, corresponding to the line, according to the world coordinates.

8. The apparatus according to claim 6, wherein the obstacle block determination unit comprises:

an intersection distance determination subunit, adapted to determine a distance between an origin of a world coordinate system and an intersection point of the X-axis on the reference road plane and an extension line of a line segment connecting two points on the reference road plane that correspond to two end points of the at least one line, according to the direction of the line segment;

a comparison subunit, adapted to compare the distance with a predetermined threshold; and an obstacle block determination subunit, adapted to determine that the edge image block is an obstacle block if the distance is less than or equal to the threshold, or determine that the edge image block is not an obstacle block.

9. The method according to claim 2, wherein the process for determining that the edge image block involving at least one of the lines is an obstacle block according to the direction of the line segment comprises:

determining a distance between an origin of a world coordinate system and an intersection point of the X-axis on the reference road plane and an extension line of a line segment connecting two points on the reference road plane that correspond to two end points of the line, according to the direction of the line segment;

comparing the distance with a predetermined threshold; and determining that the edge image block is an obstacle block if the distance is less than or equal to the threshold, or determining that the edge image block is not an obstacle block.

10. The method according to claim 3, wherein the process for determining that the edge image block involving at least one of the lines is an obstacle block according to the direction of the line segment comprises:

determining a distance between an origin of a world coordinate system and an intersection point of an X-axis on the reference road plane and an extension line of a line segment connecting two points on the reference road plane that correspond to two end points of the at least one line, according to the direction of the line segment;

comparing the distance with a predetermined threshold; and determining that the edge image block is an obstacle block if the distance is less than or equal to the threshold, or determining that the edge image block is not an obstacle block.

11. The method according to claim 2, wherein the connectivity principle is an 8-connectivity principle.

12. The method according to claim 3, wherein the connectivity principle is an 8-connectivity principle.

13. The apparatus according to claim 7, wherein the obstacle block determination unit comprises:

an intersection distance determination subunit, adapted to determine a distance between an origin of a world coordinate system and an intersection point of an X-axis on the reference road plane and an extension line of a line segment connecting two points on the reference road plane that correspond to two end points of the at least one line, according to the direction of the line segment;

a comparison subunit, adapted to compare the distance with a predetermined threshold; and an obstacle block determination subunit, adapted to determine that the edge image block is an obstacle block if the distance is less than or equal to the threshold, or determine that the edge image block is not an obstacle block.

* * * * *